April 17, 1934.   J. P. EASTMAN   1,954,989
HOSE COUPLING
Original Filed Dec. 15, 1930
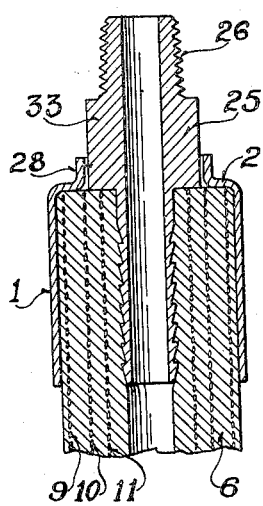
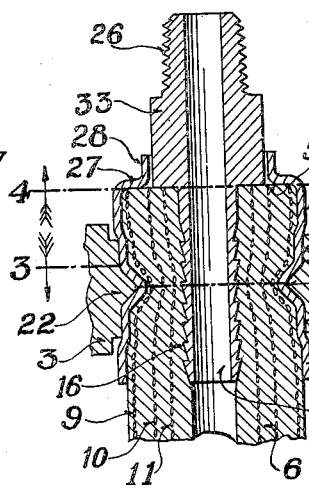
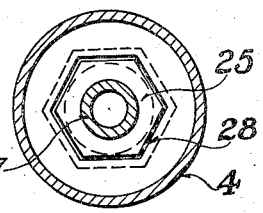
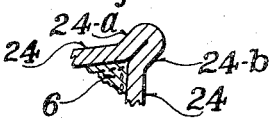
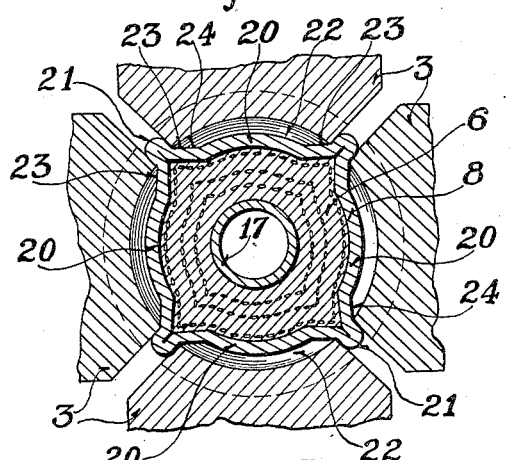
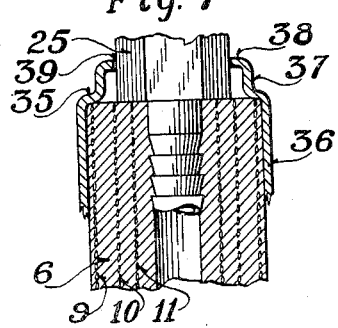
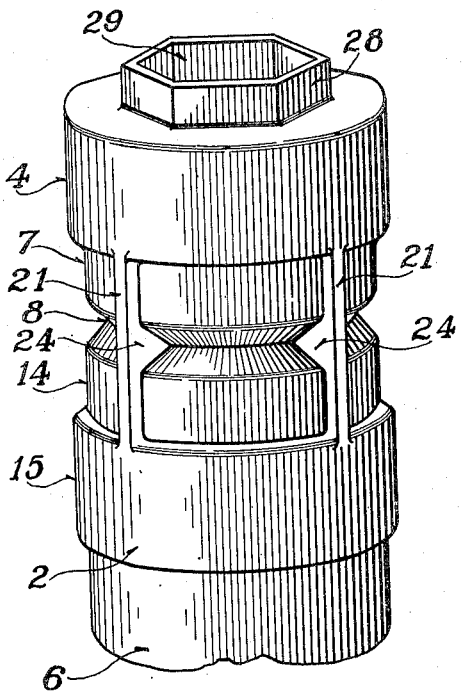
Inventor
Joseph Peter Eastman Patented Apr. 17, 1934

1,954,989

UNITED STATES PATENT OFFICE 1,954,989

HOSE COUPLING

Joseph Peter Eastman, Manitowoc, Wis.

Refiled for abandoned application Serial No. 502,585, December 15, 1930. This application March 20, 1933, Serial No. 661,752

5 Claims. (Cl. 285—84)

This invention relates to hose couplings, and provides a new form for the ferrule portion of same, which form is found to clamp certain kinds of hose more effectively on to an inner tube or "insert" than is done by forms hitherto known.

Couplings may fail by leaking or by blowing off from the entire hose, or by tearing off a part of the end of the hose through having pinched it in such way as to cut or weaken its fibres, or otherwise. And, in providing couplings for all kinds of hose, for either high or low pressures, with either wire or cotton internal braiding, with either rubber jacket or woven cotton jacket, with and without flexible metal core, and with other differences, it is found that different principles apply, and that a wide variety of designs of couplings is necessary.

Also, for the same hose, wide differences in design occur according as the demand is for a coupling that can be unscrewed and used again, or for one that can be attached once only. Of the latter class, pressed-on couplings are typical. The present invention provides a pressed-on coupling.

In the drawing:

Figure 1 is a view before contraction of a coupling made according to the invention, the view being sectional.

Figure 2 is a view of the same coupling after contraction, also sectional.

Figure 3 is a cross-sectional view on line 3—3, Fig. 2.

Figure 4 is a cross-sectional view on line 4—4, Fig. 2.

Figure 5 is a perspective view of the coupling after contraction, with the body-piece, including the inner tube, removed.

Figure 6 is a fragmentary enlarged sectional view of a rib.

And Figure 7 shows a modification, the view being partly sectional, and broken away.

The cylindrical ferrule 1, before contraction, in Figure 1, becomes the contracted ferrule 2, in Figure 2, contracted and shaped by the dies 3. In Figure 2, the first portion 4 of the ferrule surrounding the end part 5 of the hose 6, is not contracted; while the second portion 7 of the ferrule is somewhat contracted; and the third portion 8 is deeply contracted in the form of a sharp V, sinking itself into the substance of the hose, and causing the woven cotton jacket 9 and the two sheaths of wire or cotton braiding 10 and 11 to displace, upward and downward, so far as they are able, the sheaths of rubber that form the remainder of the hose.

Continuing the sequence, the fourth portion 14 of the ferrule is somewhat contracted, and the fifth portion 15 is not contracted.

The essential grip is at the V, the middle portion of the ferrule, and the depth of the V is carefully set so as not to injure the sheaths of cotton and wire. Then, the next portions above and below the V press the hose intimately into the barbs 16 of the inner tube 17. And the uncontracted first portion 4 aforesaid allows a key of rubber to be formed, part of such rubber being displaced from the adjacent contracted portions, if the nature of the rubber permits of such displacement.

Figure 3 shows the dies 3 as being four in number. Moving inward radially, they contract the portions opposite them of the ferrule into four sectors 20, separated by the four slight axially extending ridges or ribs 21, as shown particularly in the top view, Fig. 3. The V portion 22 of each sector of the dies has its corners 23 bevelled off, whereby the dies form on the ferrule the triangular faces 24, sloping apart from each other, seen most clearly in Fig. 5.

Referring more particularly to Fig. 6, the said triangular faces 24 may otherwise be described as curtain-like extensions of the two walls 24—A and 24—b of each rib 21.

Due to said bevelling of the corners 23 of the dies, the deeply protruding portion 8 aforesaid of the ferrule is not a continuous ring, but is a gapped ring, the gaps being in the form of transverse V-shaped notches.

Said non-continuous ring is able to bite more deeply into the hose substance than a continuous ring could do.

Due to the gaps, however, the four portions of the V-ring would tend to spring outward under the great resistance of the hose substance, were it not that said curtain-like faces 24, lying in non-circumferential planes, have a bracing effect upon the walls of said portions of the V-ring.

And, further, if said corners 23 were not bevelled off, said corners would puncture the ferrule.

The inner tube or insert 17 aforesaid is made rigid with the body 25, and is preferably integral with same. And at the outward end of the body the thread 26 is formed, for use in coupling the hose to another hose, for instance.

Said body 25 is made of hexagonal stock, of as small a diameter as will allow of said thread and insert being formed, thereby reducing to a minimum the weight of rod consumed in making a body.

The ferrule has at its outward end the inward flange portion 27, which serves as an end wall against which the end 5 aforesaid of the hose abuts. Extending outward from said end wall in axial direction the collar 28 is formed, hexagonal in cross-section, and forming the hexagonal opening 29, Figure 5, into which opening the hexagonal body 25 fits closely enough to prevent relative turning as between ferrule and body. If such collar were absent the thin inward edges of the end wall portion aforesaid of the ferrule would be liable to slip off the hexagonal portion of the body. But the collar extends the engagement to some distance beyond the end of the hose and the end wall of the ferrule, thereby dependably preventing turning of the ferrule relative to the body. Such prevention of relative turning is found to be a very desirable thing, because, if the body could turn relatively to the ferrule, then the inner tube would be loosened in the hose. Such tendency to turn occurs when the coupling is screwed, by means of its thread 26, on to a supply pipe, for instance.

Said collar 28 acts also as a re-enforcement, strengthening said flange portion 27 of the ferrule against tendency to yield under twisting strain relative to the body.

The hexagonal portion of the body is extended beyond said collar 28, whereby the hexagonal portion 33 is left exposed, giving room for a wrench to be applied.

The complete body, formed as described, is, at its largest part, of small diameter compared with the hose and the ferrule. The whole of it can be passed through said collar 28.

Figure 7 shows a modification in which the hose 6 abuts against the end wall 35 of the ferrule 36. Said end wall then turns outward, forming the axially extending circular flange 37. And the end 38 of the cup thus formed is pierced as shown at 39, to admit, and to fit around, said hexagonal body 25, to prevent relative turning of ferrule and body, as described more fully hereinbefore in reference to the preferred form.

I claim:

1. A hose clamp comprising a ferrule adapted to be permanently contracted on to a hose, said ferrule when contracted having areas of intrusion alternating with axially extending ribs, one of said ribs having substantial portions of its walls sloping apart from each other, whereby said rib is substantially V-shaped in cross section.

2. A hose clamp comprising a ferrule adapted to be permanently contracted on to a hose, said ferrule when contracted having areas of intrusion alternating with axially extending ribs, portions of said areas of intrusion together constituting an interrupted ring-wise groove, extending interruptedly around the hose, and biting into the hose, and one of said axially extending ribs comprising two walls, each such wall having a curtain portion, having its edges merged into the walls of a portion of said interrupted groove.

3. A hose clamp comprising a ferrule, said ferrule having, when clamped upon a hose, a waist portion in the form of an inwardly protruding interrupted ring, partially encircling the hose and intruding deeply into the substance thereof, two cylindrical portions, respectively above and below said waist portion, less intruding, and a cylindrical portion around the end of the hose, not intruding.

4. A hose coupling comprising an inner tube adapted to enter the bore of a hose, a body rigid with said inner tube, and a ferrule adapted to fit over the end of the hose, said body having a shoulder against which the end of the hose is adapted to abut, immediately followed by an axially extending non-circular portion, and said ferrule having an inwardly extending stop, against which the end of the hose is adapted to abut, followed by a non-circular collar adapted to fit over said non-circular portion to prevent relative turning, said stop and the outward end of said collar being spaced apart in axial direction, whereby any tendency for the collar to get between said shoulder and the end of the hose is avoided, said stop and said collar being integral parts of the ferrule.

5. A hose coupling comprising an inner tube adapted to enter the bore of a hose, a body rigid with said inner tube, and a ferrule adapted to fit over the end of the hose, said body having a shoulder against which the end of the hose is adapted to abut, immediately followed by an axially extending non-circular portion, and said ferrule having an inwardly extending flange portion adapted to act as a stop for the end of the hose to abut against, such flange portion being followed by a cylindrical portion, followed in turn by an end-wall portion having a non-circular aperture, said cylindrical portion being adapted to loosely surround said non-circular portion of the body, while said aperture fits more closely around same to prevent relative turning.

JOSEPH PETER EASTMAN.